(12) United States Patent
Daly et al.

(10) Patent No.: US 6,339,747 B1
(45) Date of Patent: Jan. 15, 2002

(54) WEATHER TRACKING AND DISPLAY SYSTEM AND METHOD

(75) Inventors: Richard T. Daly; David N. Erickson; Terence F. Kelly, all of Madison; Victor W. Marsh, Fitchburg; John S. Moore, Middleton; Randall T. Wiggins, Madison, all of WI (US)

(73) Assignee: Weather Central, Inc., Madison, WI (US)

( * ) Notice: Subject to any disclaimer, the term of this patent is extended or adjusted under 35 U.S.C. 154(b) by 0 days.

(21) Appl. No.: 09/543,046

(22) Filed: Apr. 5, 2000

(51) Int. Cl.[7] ............................................. G06F 169/00
(52) U.S. Cl. ...................................................... 702/3
(58) Field of Search ...................... 702/3, 4, 5; 342/26, 342/460

(56) References Cited

U.S. PATENT DOCUMENTS

| | | |
|---|---|---|
| 4,347,618 A | 8/1982 | Kavouras et al. |
| 4,402,672 A | 9/1983 | Lowe, Jr. |
| 4,422,037 A | 12/1983 | Coleman |
| 4,506,211 A | 3/1985 | Coleman |
| 4,521,857 A | 6/1985 | Reynolds, III |
| 5,111,400 A | 5/1992 | Yoder |
| 5,121,430 A | 6/1992 | Ganzer et al. |
| 5,270,820 A | 12/1993 | Fellinger |
| 5,517,193 A | 5/1996 | Allison et al. |
| 5,568,385 A | 10/1996 | Shelton |
| 5,583,972 A | 12/1996 | Miller |
| 5,699,442 A | 12/1997 | Fellinger |
| 5,717,589 A | 2/1998 | Thompson et al. |
| 5,839,089 A | 11/1998 | Yasuda et al. |
| 5,848,378 A | 12/1998 | Shelton et al. |
| 5,999,882 A | 12/1999 | Simpson et al. |
| 6,018,699 A | 1/2000 | Baron, Sr. et al. |
| 6,125,328 A | 9/2000 | Baron et al. |
| 6,188,960 B1 * | 2/2001 | Baron et al. ................... 702/3 |

OTHER PUBLICATIONS

Baron Services, Inc., FasTrac/NexTrac Operations Manual, Version 2.0, pp. 39–47, Jun. 1997, Huntsville, Alabama.

* cited by examiner

Primary Examiner—Donald E. McElheny, Jr.
(74) Attorney, Agent, or Firm—Foley & Lardner

(57) ABSTRACT

A system and method for preparing and manipulating a weather display including accurately displaying the current position of a weather storm cell and predicting and displaying a future path of the cell is provided. Various operator tools and functions are provided in a graphical user interface to allow an operator to prepare a weather display for broadcast, and to manipulate the display during a live weather presentation. A position and predicted track of a storm cell may be determined based on weather information from a first weather information source, e.g., NEXRAD, and displayed on a weather display. The displayed position of the storm cell and track is updated between the receipt of NEXRAD information updates to maintain an accurate display of storm cell position. Updates of the displayed storm cell position may be provided periodically between NEXRAD updates based on storm cell speed and heading information contained in the latest available NEXRAD data. Preferably, the displayed storm cell position and track is updated between the receipt of NEXRAD updates based on weather information received from a second weather information source, e.g., live radar data. Thus, integration of detailed NEXRAD weather data information with live radar data to provide an enhanced ability to predict accurately the movement of severe weather cells and to provide an accurate warning to those in the path of such cells is provided.

50 Claims, 7 Drawing Sheets

| St | TVS | MESO | MaxHail | SevereHailProbability | HailProbability | VIL | Direction | Speed | MaxDBZ | Height | Top |
|---|---|---|---|---|---|---|---|---|---|---|---|
| 1:N5 | | | | | | | | | | | |
| 1:L6 | | | | | | | | | | | |
| 1:G1 | NONE | MESO | 0.00 | 0 | 0 | 20 | 242 | 52 | 60 | 6.100000 | 18.900000 |
| 1:F8 | NONE | MESO | 0.00 | 0 | 0 | 15 | 226 | 72 | 55 | 12.300000 | 18.900000 |
| 1:E0 | NONE | MESO | 0.00 | 0 | 0 | 15 | 223 | 72 | 53 | 5.100000 | 19.600000 |
| 1:O0 | NONE | MESO | 0.00 | 0 | 0 | 9 | 237 | 50 | 59 | 12.100000 | 20.299999 |
| 2:W3 | NONE | MESO | 0.50 | 40 | 50 | 29 | 245 | 70 | 56 | 11.900000 | 22.900000 |
| 1:M3 | NONE | MESO | 0.50 | 20 | 20 | 39 | 250 | 52 | 62 | 15.000000 | 21.500000 |

FIG. 5

Storm Profile Settings

Profile Name [Meso]    Image Name [C:\StormSentine\Cutout\tstorm.tif] [Browse]

TVS [ ] [▸]    Scale [1] [ ] Justification    [ ] Cue Color ☑ Flash

MESO ☑ [MESO] [▸]    [Add New] [Modify] [Delete]    [Move Up] [Move Down]

Severe Hail Probability [ ]

Hail Probability [ ]

Max Hail ☑ [.6]

VIL [ ]

Max DBZ [ ]

```
Tornado TVS=TVS
ETVS TVS=ETVS
Meso MESO=MESO,MaxHail>=.6
Meso MESO=MESO
Meso MESO=3DCO
Meso MESO=UNCO
Severe Hail SvrHailPr>=40,MaxHail>=.5
Hail HailPr>20,MaxHail>=.25
default
```

WEATHER TRACKING AND DISPLAY SYSTEM AND METHOD

FIELD OF THE INVENTION

The present invention pertains generally to systems and methods for displaying representations of weather phenomena over maps of geographic locations for televised weather presentations, and the like, and computer-based systems and methods for preparing and manipulating such displays including systems and methods for tracking and displaying the expected the future path of such weather phenomena.

BACKGROUND OF THE INVENTION

Various systems and methods have been developed for providing viewers of broadcast and cable television weather presentations with informative and accurate weather information. Typically, such systems provide a display of representations of weather phenomena, e.g., clouds, rain, storms, etc., overlaid on a map of a geographical area of interest. Such displays were originally created by drawing representations of weather phenomena, or placing pre-made weather phenomena symbols, on a physical map of an area of interest. The image of the map was then broadcast to viewers, usually with a weather presenter positioned in front of the map to provide an explanation of the map display. Computer systems are now employed to facilitate the generation of weather displays, using computer-generated graphics and animation.

A typical computer-implemented system for preparing a weather presentation will include detailed digital maps of geographic areas of interest stored for access by the computer. Weather information, such as satellite imagery and/or weather radar information, such as NEXRAD weather radar information provided by the government or live local radar data, is provided to the system. The system scales the received weather information, which is then overlaid on the digital maps to create a graphic display of the weather for a particular area of interest. The weather information received by the system may be processed to generate weather symbols, color contours, or other representations of the weather information which are overlaid on the digital maps to create the weather display. A series of such weather displays may be generated by the computer system, and played back in sequence to provide an animated image of the movement of weather phenomena through a geographic area. Such systems may provide an operator with various tools for selecting, e.g., the geographic location to be displayed, reference points to be displayed on the geographic map, e.g., cities, roads, borders, etc., the source of weather information to be displayed on the geographic map, e.g., satellite imagery or radar, and how the weather information will be represented, e.g., symbols, color contours, etc.

Using a system as described above, a complete weather display may be prepared in advance for replay and broadcast at a later time as part of a televised weather presentation. In some cases, however, particularly during rapidly developing severe weather conditions, a live "on-air" weather presenter may desire to alter the weather display in real time during a live weather presentation. For example, a weather presenter may desire to zoom in on particular geographic areas of interest, where severe weather is developing or headed, to provide an instantaneous detailed display of the position of a storm to viewers. Similarly, the weather presenter may desire to alter how weather information is presented, or the type of weather information being presented, during the live presentation, to provide a better real time explanation to the viewers of the weather situation that is developing. Real time changes to a weather display can be presented to viewers by scan converting the operator display output of the system used for preparing the display for broadcast. In such a case, however, broadcast viewers will see all of the manipulations which the weather presenter is performing to alter the display. For example, various menus, keystrokes and mouse inputs, and the like, which are employed by the presenter manipulating the display, will be visible to viewers of the presentation. This results in an unprofessional and distracting presentation. What is desired, therefore, is a system for preparing a weather display which provides a wide range of operator tools and functions for preparing an informative and detailed weather presentation, and which allows rapid manipulation of the weather display by a presenter during a live presentation in a manner so as to enhance the presentation, without distracting the viewer from the information being provided by the weather presentation.

The most useful television weather presentations provide viewers not only with information on the past and present position of weather phenomena, but also with a prediction of the future path of certain weather of interest. For example, viewers are very interested in knowing if and when a developing storm is likely to reach their location. The weather information received by a system for preparing a weather display, as described above, includes information which may be used to provide such a prediction. For example, NEXRAD weather radar information, employed by many such systems, includes a detailed "storm attributes" table, which defines storm cells, and provides detailed characteristics of such cells, such as the direction and speed of movement of such cells and whether such cells contain elements such as hail or tornadoes. This information may be used by the system for providing a display to viewers of when a particular storm cell is expected to reach a particular location, and the contents of the storm cell. What is desired is a system which allows an operator manually or automatically to employ such information to generate a display of the predicted path of movement of severe weather, including a display of when a particular weather condition is expected to reach a particular location.

Government-provided NEXRAD radar data includes detailed information on storm cells, including detailed information on the characteristics of the cells, including their speed and direction of movement, contents (e.g., hail or tornadoes), etc. This detailed information is obtained by the NEXRAD radar system by performing a volumetric radar scan of the atmosphere. NEXRAD radar systems are very expensive, costing millions of dollars, and the physical process of scanning the atmosphere as well as the computing process of deriving detailed weather information from the scan take relatively long to complete. A weather tracking and display system can expect to receive updated NEXRAD weather information no more often than every six (6) minutes. Existing systems which provide a display of the location and predicted path of movement of severe weather based on NEXRAD data only provide an update of the display when updated NEXRAD data is received by the system, i.e., every six (6) minutes or so. Such a display does not reflect the continuous movement of the storm cell between NEXRAD updates. What is desired, therefore, is a system which updates the position of NEXRAD storm cell attributes between NEXRAD updates.

Furthermore, the speed and direction of movement of a severe weather cell can change significantly during the relatively long period between NEXRAD updates. Thus, the predicted track of a storm cell will become increasingly inaccurate between NEXRAD updates if NEXRAD information alone is relied upon to determine the predicted track of a storm cell. Local or remote live radar systems perform a much more rapid scan of the atmosphere, and are, therefore, able to provide more up-to-the-minute information on the current location of a severe storm weather cell. Since such live radar systems are significantly less expensive than NEXRAD radar systems (costing tens to hundreds of thousands of dollars), many television news and weather operations have their own live local radar systems, in addition to access to government provided NEXRAD data. However, live radar does not provide the detailed information regarding the attributes of storm cells which is provided by NEXRAD. Current weather tracking and display systems allow an operator to display NEXRAD radar information overlaid on a map of a geographic location, and to display live radar data overlaid on the same map. In such a display scheme, however, there is no interaction or integration of the NEXRAD information with the live radar information. What is desired is a system which integrates weather information from different sources, such as NEXRAD and live radar data, into a single weather display in such a manner as to improve the ability of a weather tracking and display system to predict and display the path of a severe weather cell and, e.g., the arrival time of such a cell at particular geographic locations.

SUMMARY OF THE INVENTION

The present invention provides a system and method for preparing and manipulating a weather display including accurately displaying the current position of detailed weather storm cell information and predicting and displaying the future path of a weather storm cell. A weather tracking and display system in accordance with the present invention provides various operator tools and functions in a graphical user interface which allow an operator to prepare a weather display for broadcast, and to manipulate the display during a live weather presentation. The system and method of the present invention provides for accurately displaying the current position of detailed weather storm cell information and predicting and displaying the future path of the cell. Accurate storm cell path prediction and display is provided by updating the displayed position of detailed NEXRAD weather cell information between NEXRAD updates, and, more particularly, by integration of detailed NEXRAD weather radar information with live radar data to provide an enhanced ability to predict accurately the movement of severe weather cells and to provide an accurate warning to those in the path of such cells.

A weather tracking and display system in accordance with the present invention may be implemented in software on a conventional commercially available computer system. The system may receive weather information from various sources, such as storm warning information from the National Weather Service weather wire (typically provided as an input to a WxWarn system), NEXRAD, live radar data, and satellite imagery. This weather information is combined with vector-based digital map data to provide a high quality weather display. The weather display is presented on an operator display along with graphical user interface tools which allow an operator to manipulate the display. The weather display thus generated may be saved or broadcast live as part of a live television weather presentation. The weather display may be broadcast in a manner such that the graphical user interface tools and manipulations employed by the operator to manipulate the display during a live presentation are not visible to viewers of the presentation.

Various graphical user interface operator tools may be provided on the system operator display to allow an operator of the system to manipulate the display view. A layer list graphical user interface is provided on the operator display to allow an operator of the system to select the geographical elements which will be displayed on the map displayed in the display window. A label interface allows an operator of the system to label interactively map elements displayed in the weather display. Information on the map view currently displayed in the display window is provided by the user interface. The user interface allows the operator to define the geographical position and scale of the map view, and to save such a view as a preset view for easy recall using the graphical user interface or a keyboard. Other graphical user interface tools allow an operator to zoom in, zoom out, and return to a home position in the map view. The display of the map presented in the weather display window preferably includes display filtering associated therewith, which determines at which map scale specific geographic features will be displayed. Navigated banners, logos, symbols, and other cut-outs may be positioned on the map based on latitude and longitude such that, even though the scale and/or position of the map view is changed, the cut-outs will remain positioned on the map in the proper geographic location.

A weather tracking and display system in accordance with the present invention preferably provides for both manual and automatic storm cell tracking and display. Either a manual or automatic storm cell tracking mode may be entered into from the graphical user interface. In manual tracking mode, an operator of the system draws a storm line on a map in a weather display window, and direction lines indicating the direction and speed of movement of the storm line. In automatic tracking mode, the operator selects storm cells to be tracked from NEXRAD information presented on the weather display or in a storm table. Alternatively, or additionally, the NEXRAD storm cells to be tracked in automatic tracking mode may be selected automatically when characteristics of the storm cells satisfy certain preselected criteria. The system may automatically generate a marker at the current location of the storm cell, and a track display, such as tracking wedge, indicating the speed and direction of movement of the characteristics of the selected cell, based initially on the cell location, speed, direction, and other information available in the NEXRAD storm attributes table. In accordance with the present invention, the position and predicted track display of the storm characteristics may be updated between the receipt of NEXRAD data updates based, for example, on live radar storm position information. The detailed information describing other characteristics of the cell is updated each time new NEXRAD information is received.

Whether in automatic or manual tracking mode, the weather tracking and display system displays a window which contains a list of cities in the predicted path of a storm, and the estimated arrival time, or countdown time to impact, of a storm line or storm cell at selected cities. Each city included in the list is preferably highlighted in the correct geographic position on the weather display.

To improve tracking prediction accuracy, the displayed position and predicted track of a storm cell whose characteristics are defined by detailed NEXRAD information is updated between the receipt of NEXRAD information. This may be accomplished by updating the displayed storm cell position, and advancing the position of the NEXRAD storm attributes and predicted track display, periodically between NEXRAD updates, e.g., every minute, based on storm direction and speed of movement information contained in the latest available NEXRAD information itself. Preferably, however, the position of the NEXRAD defined storm cell and predicted track display are advanced by the system using live radar information.

In accordance with the present invention, a selected storm cell defined by detailed NEXRAD information is automatically correlated or linked to the same storm cell whose position is determined by live radar information. This may be accomplished by, for example, time synchronizing the latest available NEXRAD information with corresponding live radar data, and then analyzing the live radar data to locate storm activity therein which most likely corresponds to a selected NEXRAD storm cell. For example, the live radar image may be analyzed to locate the area of high intensity activity nearest to the time synchronized location of the selected NEXRAD storm cell. This area of high intensity is then linked or correlated to the NEXRAD defined storm cell. Each time a live radar scans the storm cell, a new location of the storm cell is determined. The position of the detailed NEXRAD defined attributes of the storm cell may thus be advanced to the new position using the live radar data. A new predicted track display, e.g., arrow or tracking wedge, is then generated and displayed, extending from this updated location, using the attributes for the storm cell as provided by the NEXRAD storm attributes table. Alternatively, the live radar information may also be used to update the speed and direction of movement of the displayed storm cell. Thus, live radar information may also be used to adjust the track display, thereby providing for a more accurate cell position and predicted track display. In this manner, the locations and storm cell characteristics (e.g., intensities) provided for a storm cell in a NEXRAD storm attributes table are advanced along a predicted line between NEXRAD updates using the speed and direction of movement of the storm cell as determined from a live radar source. Thus, the present invention provides for improved accurate location and tracking of storm cells using integrated NEXRAD and live radar data by taking advantage of the best characteristics of each system, namely, detailed storm characteristics provided by NEXRAD and timely accurate location updates provided by live radar.

Further objects, features, and advantages of the present invention will be apparent from the following detailed description taken in conjunction with the accompanying drawings.

BRIEF DESCRIPTION OF THE DRAWINGS

FIG. 5 is an exemplary storm table user interface listing storm cells identified in NEXRAD information, and selected characteristics of such cells, wherefrom storm cells to be tracked in a weather tracking and display system in accordance with the present invention may be selected.

FIG. 6 is an exemplary storm profile settings menu user interface, which allows an operator to define storm profiles which determine how NEXRAD storm cells will be handled by a weather tracking and display system in accordance with the present invention.

DETAILED DESCRIPTION OF THE INVENTION

The present invention provides a system and method for preparing and manipulating a high quality weather display including an accurately determined and displayed current position and future path of detailed weather storm cell information. In accordance with the present invention, a weather presenter, or other operator, prepares a display of weather phenomena overlaid on a map of a selected geographic location. The display may be used to track severe weather phenomena, and may include a display of the predicted arrival of severe weather at specific geographic locations, including the type, intensity, or severity of the weather. A weather tracking and display system in accordance with the present invention provides various operator tools and functions in a graphical user interface to allow the operator to prepare a weather display for broadcast, and to manipulate the display during a live weather presentation. The system and method of the present invention provides for updating of the displayed position and predicted track of detailed NEXRAD defined storm cell attributes or characteristics between NEXRAD updates. The integration of detailed NEXRAD weather radar information with live radar data to provide an enhanced ability to predict and display accurately the movement of severe weather cells and to provide an accurate warning of both time of arrival and characteristics (e.g., type and severity) of a storm to those in the path of such cells is provided. Although the present invention will find particular applicability for use in preparing, and during the presentation of, a live on-air or cable television weather presentation, it should be understood that the present invention may be employed in the preparation and manipulation of a weather display to be distributed in any media, or in any situation where accurate weather tracking, prediction, and display is desired.

Figure 1:
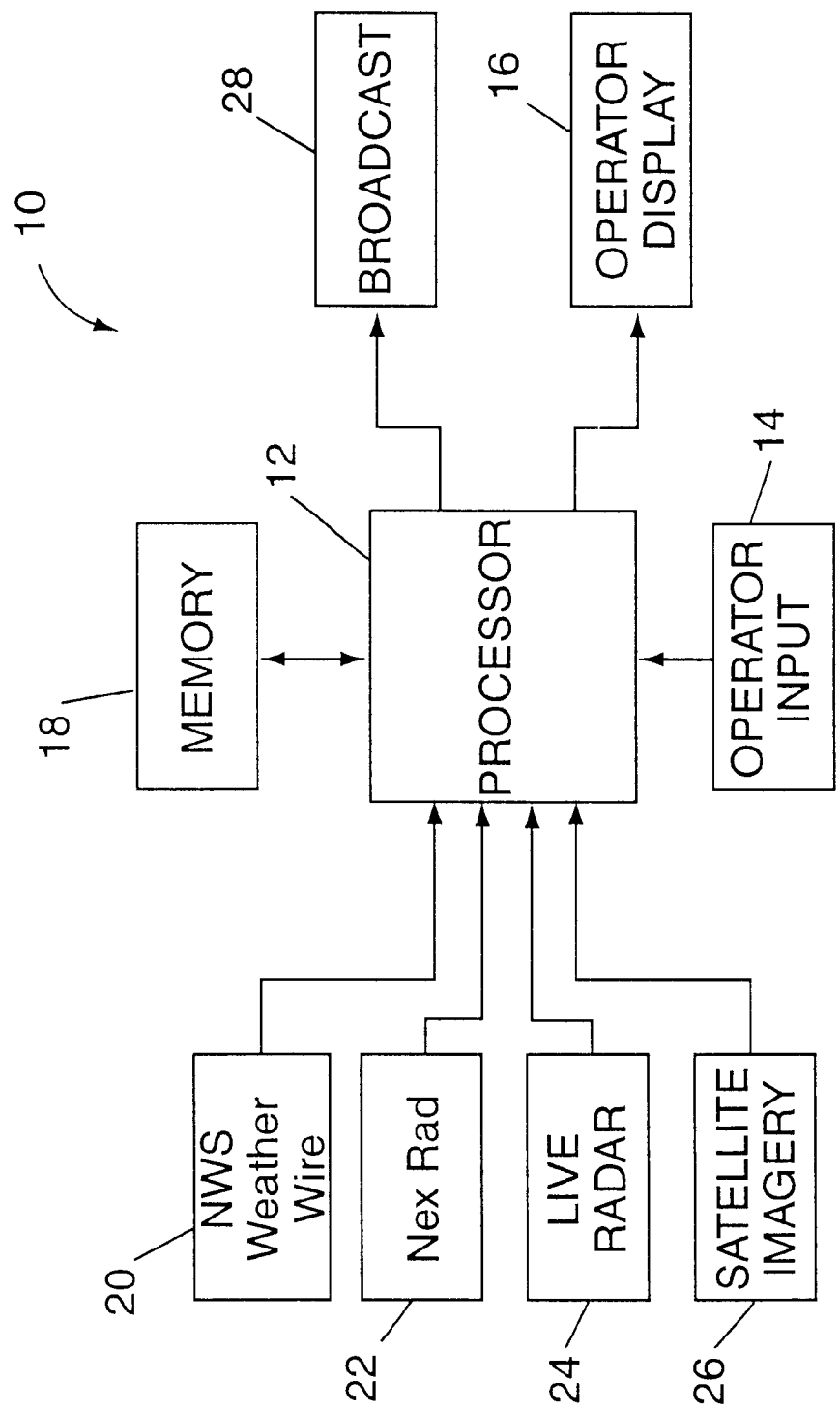
FIG. 1 is a schematic block diagram of a weather tracking and display system in accordance with the present invention.

An exemplary weather tracking and display system in accordance with the present invention is illustrated at 10 in FIG. 1. The weather tracking and display system 10 of the present invention is a computer-implemented system. The system 10 may be implemented using any conventional modern commercially available computer processor 12. A processor 12 which has sufficient operating speed to manipulate large amounts of graphical and other data is preferred. For example, the processor 12 may preferably be implemented using the Silicon Graphics 320 Visual Workstation processor, or another Silicon Graphics NT Visual Workstation. Such processors are known to have sufficient power to implement a weather tracking and display system in accordance with the present invention.

The processor 12 preferably includes conventional operator input 14 and display 16 devices associated therewith. The operator input devices 14 may include, for example, a conventional computer keyboard, mouse, track ball, etc. For manipulation of the display provided by the system 10 during a live broadcast, the telestrating system and methods described in U.S. Pat. Nos. 5,270,820 and 5,699,442, incorporated herein by reference, may be integrated into the system 10. A conventional operator display device 16 capable of displaying high quality graphics may be employed. A Silicon Graphics 1600 SW Flat Panel Monitor, or other similar operator display device 16, is preferred.

The processor 12 is also provided with conventional computer memory 18. The memory 18 may be implemented in any conventional manner and may include both RAM memory and disk or other mass memory storage devices. The memory 18 is employed in a conventional manner to store the software programs executed by the processor 12 to implement a weather tracking and display system in accordance with the present invention. Weather data information and digital geographic map information is also stored in memory 18 in a conventional manner for use by the processor 12. As will be discussed in more detail below, the weather tracking and display system 10 of the present invention employs high resolution digital maps for generating weather displays. Any commercially available high quality digital map data set may be employed. Most such commercially available digital map data sets include information for the entire country. Such digital map data is preferably vector-based. Vector-based map data allows borders to be sharp and crisp no matter how far or close the map image is "zoomed" in or out for viewing. The digital map data stored in memory preferably includes state borders, county borders, interstates, highways, roads, city streets, metropolitan areas, etc.

The processor 12 is preferably adapted to receive weather information from a variety of sources. Such sources of weather information may include National Weather Service weather wire storm warning information 20, NEXRAD weather radar information 22, live radar data 24, and satellite imagery 26. The National Weather Service weather wire information 20 includes weather warning bulletins authored by the National Weather Service Storm Prediction Center, and other related government agencies. The weather warning bulletins include tornado warnings, severe thunderstorm warnings, flash flood warnings, and the like. This information is typically employed by WxWarn, or another system, for displaying the warning bulletins, e.g., as an overlay on a television broadcast. WxWarn, or another system for displaying the weather wire warning bulletins, may be integrated into the weather tracking and display system 10. NEXRAD weather data 22 is also provided by the government. NEXRAD information 22 includes a storm attributes table which defines storm cells and provides detailed information concerning the cells, including the characteristics of the cells (e.g., hail and vortex intensity and location, rain fall intensity, speed, etc.), as well as the position, direction, and speed of movement of the cells. NEXRAD radar data is obtained from a volumetric scan of the atmosphere and is provided to the system 10 on a periodic basis, e.g., approximately every six (6) minutes. Live radar data 24 may be provided to the system 10 from one or more local or remotely located radar systems. Live radar data 24 preferably provides real time radar sweep information to the system 10 much more often than NEXRAD information is provided to the system 10. For example, a conventional radar sweep may generally be completed in thirty (30) seconds to ninety (90) seconds. If the live radar is operated to scan only a selected sector of interest, live radar information for the sector may be provided as often as every ten (10) seconds. Although NEXRAD 22 and live radar 24 are both radar sources, NEXRAD information is provided from much more expensive and powerful radars and information processing systems than conventional live radar. Thus, NEXRAD radar information is much more detailed, but less timely, than live radar information. Satellite imagery 26 provided to the system 10 may include high resolution visible and infrared satellite imagery. The format in which the weather information is provided from the various weather information sources to the system 10 is available from the government or commercial providers of weather wire 20, NEXRAD 22, and satellite imagery 26. The format of live radar information 24 provided to the system 10 will depend on the live radar system employed for any particular application.

A weather tracking and display system 10 in accordance with the present invention provides an operator of the system with various tools, implemented in a graphical user interface, for preparing a high quality weather display for broadcast, i.e., over the air, via cable, etc. to viewers, and for manipulating the display during a live broadcast. The system 10 preferably provides an output of such a weather display to a conventional over-the-air or cable broadcast system 28. As will be discussed in more detail below, the weather display provided to the broadcast system 28 is preferably different from the operator display provided on the operator display device 16. Operator tools and manipulations visible on the operator display are preferably not included in the weather display provided for broadcast 28. Alternatively, or additionally, weather displays prepared using the system 10 may be stored in digital form in memory 18, or in analog form, to tape, etc., for retrieval and replay at a later time.

In accordance with the present invention, the producer of a weather presentation, such as a live presenter or meteorologist, is provided with the tools needed to prepare and display interactively a host of weather information on a variety of geographic scales. In accordance with the present invention, these tools are implemented in software and provided to the operator as graphical user interface tools presented in an operator display which is displayed on the operator display device 16.

Figure 2:
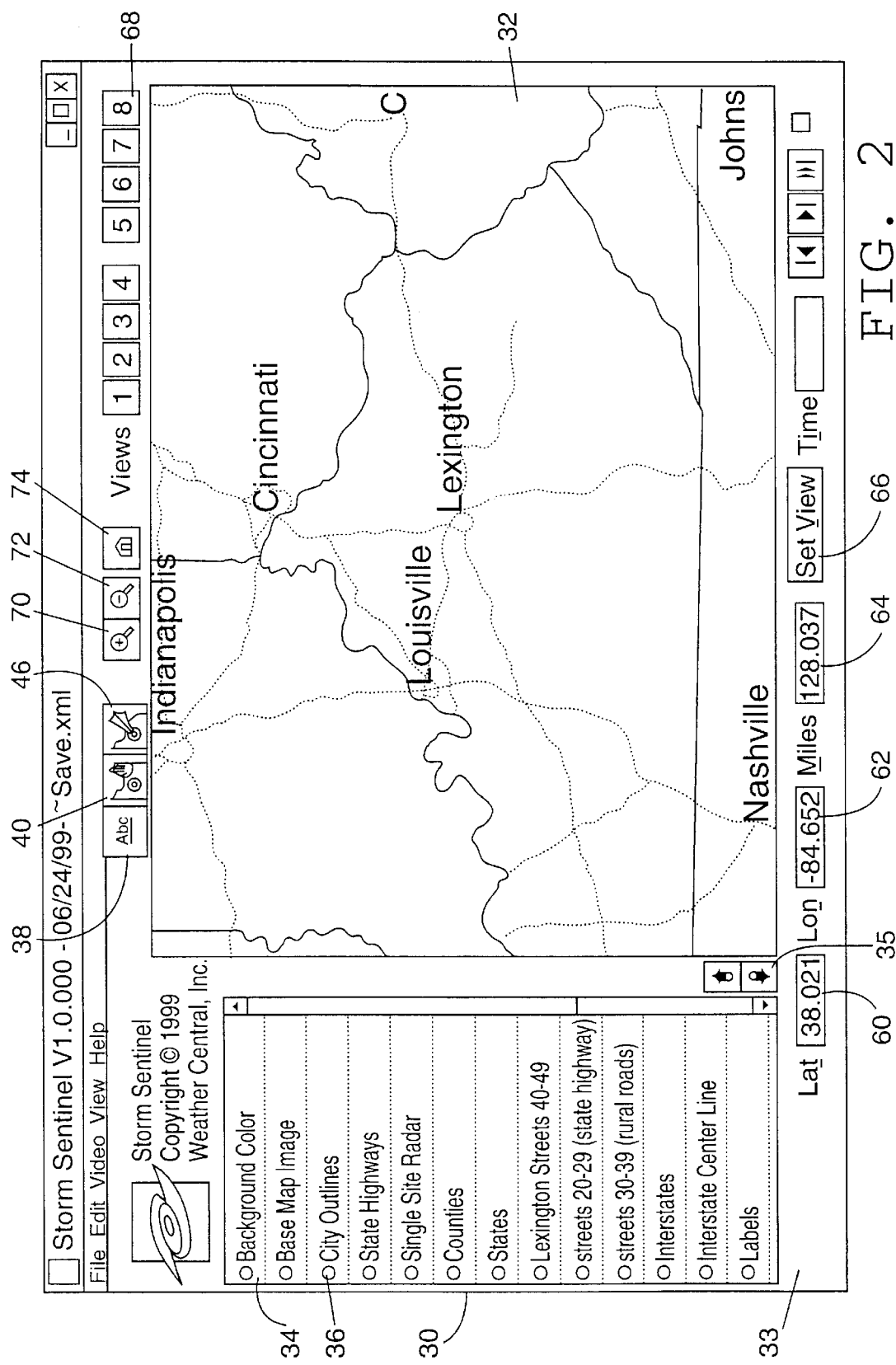
FIG. 2 is an exemplary operator display for a weather tracking and display system in accordance with the present invention, including a weather display window and graphical user interface tools for manipulating the weather display in the weather display window.

An exemplary operator display 30 including graphical user interface tools for preparing and manipulating a weather display is illustrated in FIG. 2. As illustrated, the operator display 30 includes a weather display window 32 and various graphical user interface menus, buttons, and other tools provided in a graphical user interface portion 33 of the operator display 30. The weather display window 32 shows the operator of the system the weather display being prepared and manipulated. The graphical user interface tools are employed by the operator to define and manipulate what is shown in the weather display window 32. In accordance with the present invention, the weather display displayed in the display window 32 is the image that is provided on the video output of the system 10 for broadcast 28. Rather than scan converting the entire operator display 30, the image rendered in the display window 32 is rendered directly to the output of the system 10 for broadcast 28. Thus, no menus, windows, or other graphical user interface tools or manipulations that are displayed in the graphical user interface 33 portion of the operator display 30, either along side of or on top of the display window 32, will be provided for broadcast.

Two different types of graphical user interface tools are provided in the operator display, and employed by an operator during different modes of operation of the system 10. During a set-up mode, provided graphical user interface tools are used to select and arrange, for example, all map-related elements. During a live weather presentation, the system may be operated in an "on-air" mode. During on-air mode operation, on-air graphical user interface tools are employed to manipulate dynamically the weather display.

The weather display presented in the weather display window 32 is preferably rendered in layers. Each layer includes different map or weather elements to be included in the weather display. Preferably, all weather information displayed in the weather display is layered over all map elements, but is made transparent so that map elements are visible through the weather phenomena being displayed.

A layer list graphical user interface 34 is provided in the operator display 30 to allow an operator of the system 10 to view the geographical elements which will be displayed on the map displayed in the display window 32 (and broadcast). The layer list graphical user interface 34 presents layers of geographic elements which may be displayed in the display window 32 as an ordered list. The order of the list determines the order that the layers will be rendered in the display window 32, and preferably may be established by an operator during the set-up mode. (A user interface 35 is preferably provided to allow an operator to change the order of the items listed in the layer list 34.) The first element to be rendered in the display window 32 is at the top of the layer list 34. Elements listed lower in the list 34 will be rendered later, i.e., on top of layers listed before them in the list 34. Thus, for example, in the example shown in FIG. 2, interstate highways will be rendered after state borders in the display window 32, and thus interstate highways will appear on top of state borders in the weather display. An operator may select a geographic element to be displayed by selecting an element from the layer list 34 using the operator input device 14, such as a mouse. A dot 36, or other marker, is provided in the layer list graphical user interface 34 adjacent to each listed element to indicate if the particular layer has been selected for display in the weather display window 32. Selection of a layer for display may be indicated by the color of the dot 36 or other marker (or the color of the element text listed in the layer list graphical user interface 34).

Various other graphical user interface tools may be provided in the graphical user interface portion 33 of the operator display 30. These tools may be employed by an operator of the system 10 for manipulating the weather display presented in the display window 32 during a live broadcast of the display.

A label control interface 38 allows an operator of the system 10 to label interactively map elements displayed in the weather display 32. The use of a vector based digital mapping package allows an operator of the system 10 to select, for example, a street or other feature displayed on the map in the display window 32, e.g., by clicking on the street or other feature using a mouse. The label interface tool 38 is then selected, which provides a window in which a label for the street or other feature may be typed using the keyboard. This label will be displayed on the map provided in the display window 32. This allows the labeling of city streets to be done easily and quickly.

Figure 3:
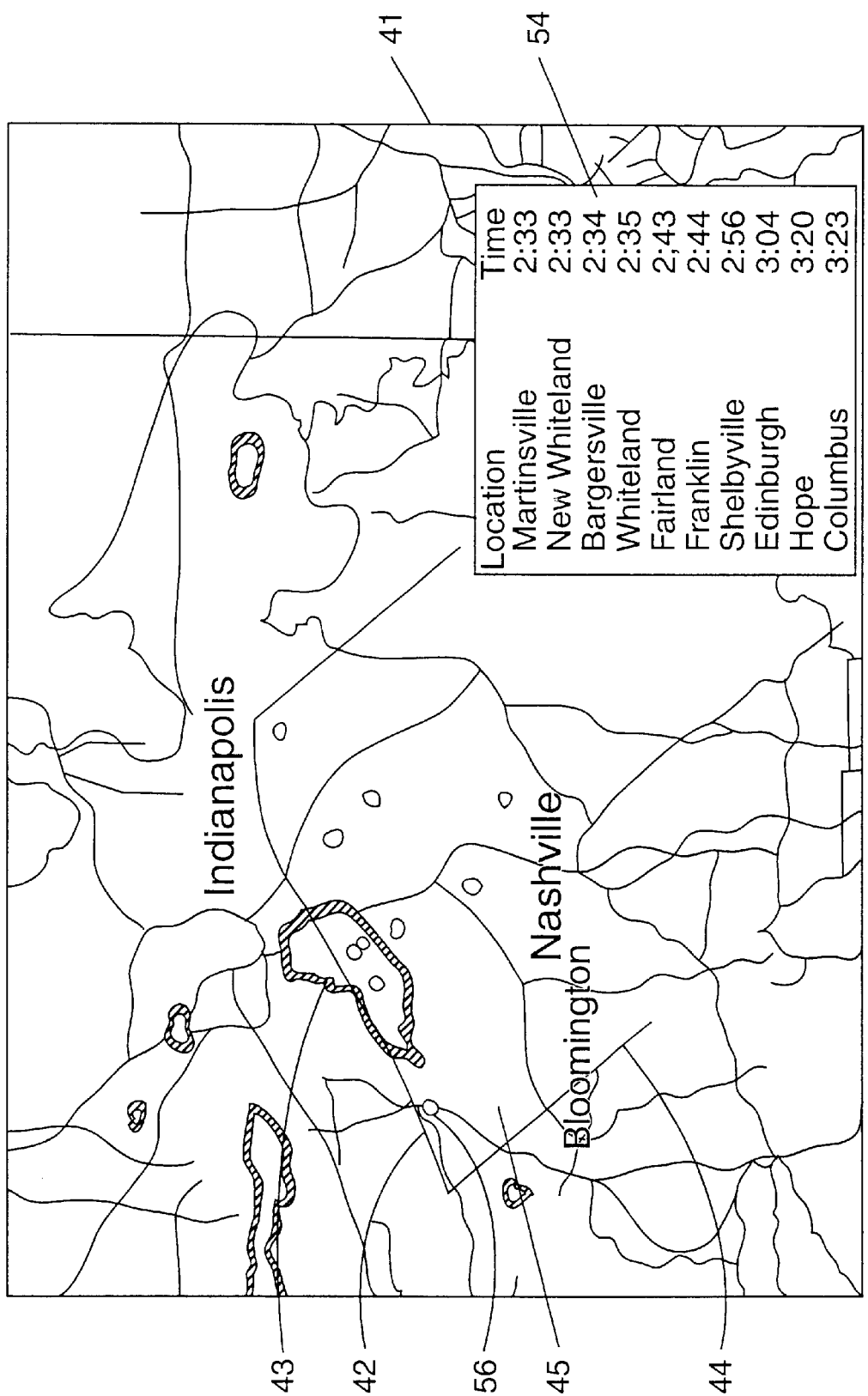
FIG. 3 is an exemplary weather display illustrating an example of manual storm cell tracking in accordance with the present invention.

A weather tracking and display system 10 in accordance with the present invention preferably provides for both manual and automatic storm cell tracking. A manual tracking mode may be entered into by selecting the manual tracking mode control button 40 on the user interface portion 33 of the operator display 30. Operation of the manual storm cell tracking mode will be described in detail with reference to the exemplary weather display 41 shown in FIG. 3. For manual tracking, an operator, using the operator input device 14, such as a mouse, draws a storm line 42 on the map in the display window. The storm line 42 indicates the current position of a storm or squall line, and may be determined from the display of, e.g., live radar, NEXRAD, or other weather information 43 in the display 41. The operator then indicates the direction and speed of movement of the storm line 42. This may be accomplished interactively. Direction lines 44, extending from the ends of the storm line 42, are drawn to indicate the direction of movement of the storm line 42. The length of the direction lines 44 indicate the speed of movement of the storm line 42. For example, the length of direction lines 44 may indicate a distance that the storm line 42 is expected to travel in a specified period of time, e.g., one hour. In manual tracking mode, the speed and direction of movement, as indicated by the lines 44, are manually determined by the operator from, e.g., the information provided in a NEXRAD storm attributes table. The area 45 between the direction lines 44 may be shaded to indicate the area over which the storm line 42 is expected to pass in the next, e.g., hour.

A weather tracking and display system 10 in accordance with the present invention preferably also provides for automatic tracking of storm cells. This mode of operation may be activated by selecting an automatic tracking mode control button 46 provided on the user interface portion 33 of the operator display 30. Operation of the automatic tracking mode will be described in detail with reference to the exemplary weather display 47 shown in FIG. 4.

The weather cells tracked in the weather display 47 in automatic tracking mode are defined by detailed NEXRAD weather data. Live radar weather information may also be displayed in the weather display 47. For automatic tracking, a subset of weather cells defined by available NEXRAD weather data and to be tracked in the weather display 47 must be selected. This selection may be performed manually or automatically.

The weather cells to be tracked in the weather display 47 may be selected manually by an operator from the weather display 47 itself, or from a storm table listing storm cells identified by the latest available NEXRAD information. The weather cells to be tracked may be selected from the weather display 47 by, for example, allowing an operator of the system to move a pointing device, using, e.g., the mouse, over the representations of weather presented in the weather display 47. As the pointing device passes over the location of a weather cell, as defined by the data provided in the NEXRAD storm attributes table, a ring 48 or other marker is automatically displayed in the weather display 47 to indicate the location of the cell. Having found the location of a cell in the weather display 47, the cell may be selected, e.g., using the mouse.

A weather tracking and display system 10 in accordance with the present invention preferably also provides a storm table, listing storm cells identified by the latest available NEXRAD information, and from which storms to be tracked in automatic tracking mode may be selected. An exemplary storm table 49, which may be accessed by an operator of the system 10 via the user interface portion 33 of the operator display 30, is illustrated in FIG. 5. The storm table 49 is derived automatically by the system 10 from the NEXRAD Composite Reflectivity Product (CRP). It contains information about storm cells that the NEXRAD radar has identified. Included in this information is the speed, direction, and intensity of the cell. There are also indicators for hail and rotation. An operator of the system 10 may select cells to be tracked automatically in the weather display 47 by selecting such cells from the storm table 49, e.g., by indicating a line in the storm table 49 using the operator input device 14 to identify a cell to be tracked automatically.

The way in which storm cells identified in available NEXRAD information will be handled by the weather tracking and display system 10, such as the order in which the storm cells will be listed in the storm table 49, may be determined by operator selectable storm profile settings. An exemplary storm profile settings menu 50, which may be accessed by an operator of the system 10 using the user interface portion 33 of the operator display 30, is illustrated in FIG. 6. The storm profile settings menu 50 allows an operator of the system 10 to characterize and customize how storm cells identified in NEXRAD information will be treated by the system 10. An operator can choose which storm cell features should be used in grouping storm cells together, and how such cells should be displayed for tracking. When a storm cell is identified in a NEXRAD CRP product received by the system 10, the system 10 will compare its attributes to a profile list 51 established using the profile settings menu 50 and displayed therein. This comparison may, for example, start at the top of the profile list 51 and work down to the bottom. (In such a case, the order of the profiles listed in the storm profiles list 51 would make a difference. The most restrictive profile should be at the top of the list 51. The default profile should be at the bottom.)

For example, the storm profile settings menu 50 may allow an operator to establish the following profile characteristics:

Profile name. This is the name that the profile will have when listed in the profile list 51 in the storm profile settings menu 50.

Image name. Each profile can have a specific cut-out image or marker assigned to it. The cut-out image or marker will be displayed in the weather display 47 when the storm cell is selected to be tracked therein, as discussed in more detail below. The cut-out may be used by a navigated cut-out layer that is populated from the storm table. Thus, each storm being tracked which satisfies a given profile can have a cut-out associated therewith that graphically represents the characteristics of the storm cell. (For example, a storm cell including tornadic activity may be represented by a tornado shaped cut-out marker.)

Flash. If this item is checked, the storm marker cut-out for a storm cell satisfying the profile will flash on and off as it is displayed in the weather display 47.

Justification. This controls which part of the displayed cut-out marker is aligned with the NEXRAD defined coordinates for the storm cell on the displayed map. For example, the marker may be selected to be displayed centered on the identified coordinates of the storm cell on the map, or positioned above, below, or to the side of the indicated coordinates.

Cue-color. This allows the operator to set the color that a storm cell satisfying the profile will appear in the storm table 49.

List controls. (Add, New, Modify, Delete, Move-Up/Down.) These controls allow an operator to take the currently displayed settings and add them to the list 51 of profiles, to apply the currently displayed settings to a highlighted profile in the list 51, to delete a currently highlighted profile from the list 51, and to move a profile up or down in the list 51.

Exemplary profile setting values that can be set for storm attributes available in the NEXRAD information, to define a storm profile, may include, for example:

TVS. The storm profile settings menu 50 may be used to profile a storm cell based on whether the storm cell includes a tornado vortex signature identified in the lowest elevation scan (TVS), whether an elevated tornado vortex signature is identified (but not identified in the lowest scan) (ETVS), or whether no TVS or ETVS is identified.

Meso. The storm profile settings menu 50 preferably allows an operator to select as a profile of a storm cell whether a mesocyclone is identified (MESO), whether 3-D correlated sheer is identified (did not meet necessary aspect ratio of length to width for "mesocyclone" identification) (3DCO), or whether uncorrelated sheer is identified (only a 2-D pattern detected with no correlation in the vertical) (UNCO).

Other profile settings which may be established by an operator using the storm profile settings menu 50 include Severe Hail Probability (probability of severe hail identified as hail that is greater than or equal to ¾ of an inch, displayed in increments of 10%), Hail Probability (identified as hail of any size, displayed in increments of 10%), Max Hail (maximum estimated hail size), Vertically Integrated Liquid (VIL) (used as a measure of storm intensity and as a hail predictor), and Max DBZ (maximum DBZ detected).

If the attributes identified in the available NEXRAD information for a storm cell satisfy the profile settings values selected, the storm cell satisfies the selected profile, and will be handled by the system 10 accordingly (e.g., as defined in the storm profile settings menu 50).

A cell to be tracked in the weather display 47 in automatic tracking mode may be selected automatically when the NEXRAD information for the cell satisfies preselected criteria. These criteria may be selected by a user of the system 10, for example, using a storm profile settings menu 50 as described above. For example, a profile related to storm intensity or some other cell characteristic may be established as described above. If the NEXRAD data for a storm cell indicates that, e.g., the storm intensity or other characteristic matches the selected profile, that storm cell will be selected automatically to be tracked in the weather display 47.

For each (automatically or manually) selected storm cell, the weather tracking and display system 10 generates a marker 52 at the current location of the storm cell and a track display, such as a shaded tracking wedge 53, indicating the speed and direction of the selected cell. The marker 52 may be of any shape, for example, as described above, the marker 52 may be a cut-out having a shape related to the characteristics of the storm cell being tracked. (The marker shape to be used may be selected by an operator using the storm profile settings menu 50, as described above.) The length of the tracking wedge 53 may indicate the speed of the cell, e.g., how far the cell will travel at current speed in, e.g., half an hour or some other time period. The length and width of the tracking wedge 53 may be user selectable. Another track display format, such as an arrow, line, parallel lines, etc., indicating storm cell speed and/or direction, may also be used. One or more storm cells may be tracked automatically in this manner. (For example, two storm cells, labeled Storm 1 and Storm 2, are being tracked in the exemplary weather display 47 shown in FIG. 4.) The data required to generate an initial display of the location, direction, and speed of the selected storm cells is derived by the system 10 directly from the data provided in the NEXRAD storm attributes table. Each time new NEXRAD data is received from the NEXRAD data source 22, the display of the position, direction, and speed of a selected storm cell 50 will be updated. The predicted path of the storm displayed in the display window is thus updated automatically at least each time updated NEXRAD data is received.

A weather tracking and display system 10 in accordance with the present invention may receive NEXRAD data from multiple NEXRAD sites. The storm data received from such multiple sites may overlap. For example, data for a single storm cell may appear in NEXRAD storm attributes tables from more than one site. Often, the storm attribute data for a single storm cell provided from different sites may not be identical. In such a case, the system 10 preferably selects the attributes which are likely to be most accurate for a particular storm cell for display on the weather display and for predicting the track of the storm cell. For example, the system may automatically select information for a particular storm cell from a NEXRAD site which indicates the greatest storm intensity, or some other user selected characteristic, or combination of characteristics, for the cell. If information for a particular storm cell from more than one NEXRAD site indicates the same intensity, or other characteristics, for the storm cell, the information from the NEXRAD site nearest to the storm may be selected. Any other method for selecting the storm cell attributes for a particular storm cell for which storm cell attributes are being provided from more than one NEXRAD site may be employed.

Figure 4:
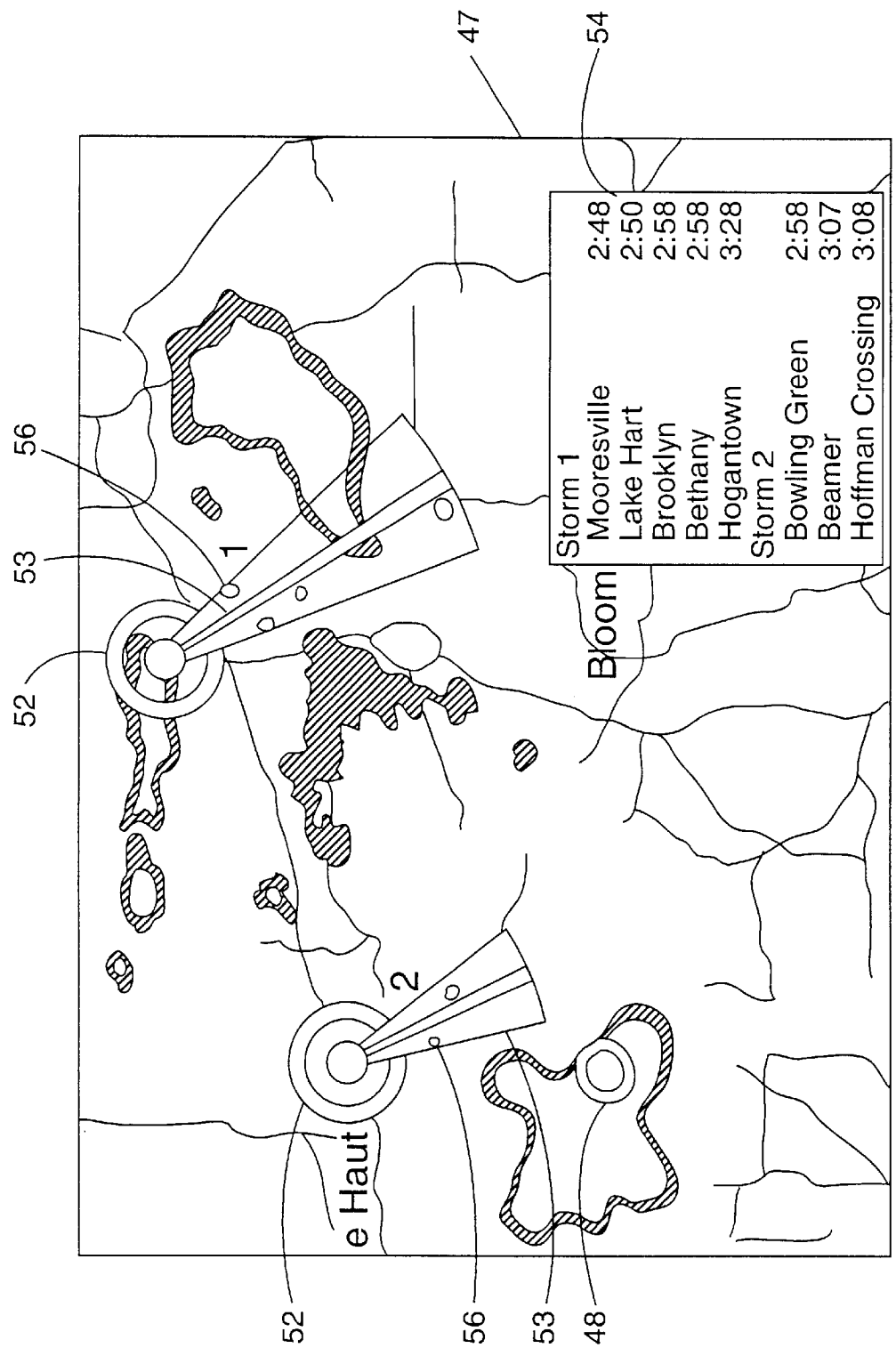
FIG. 4 is an exemplary weather display illustrating an example of automatic storm cell tracking in accordance with the present invention.

Whether in automatic or manual tracking mode, the weather tracking and display system 10 of the present invention preferably displays a window 54 in the weather display 41, 47 which contains a list of cities in the predicted path of a storm, and the estimated arrival time of the storm line 42 or a storm cell 52 at those cities, based on the manual or automatic storm track prediction. Preferably, the specific cities to be displayed in the window 54, the number of cities to be displayed in the window 54, and the order in which the cities are to be displayed are all user selectable. As illustrated, the cities may preferably be displayed in the window 54 in order of the arrival time of the line of storms 42 or storm cell 52 at the city. Note that (as shown in FIG. 4) separate lists of cities may be provided for each of the storms being tracked. Alternatively, or additionally, the display window 54 may display the time remaining from the present until the storm is predicted to reach a city. That is, a countdown to impact of the storm line 42 or a storm cell 52 at the city may be presented. Preferably each city included in the list provided in window 54 may also be highlighted as a dot 56 or other symbol displayed in the correct geographic position on the weather display in the expected path of the storm line 42 or storm cell 50.

Other graphical user interface control tools are preferably provided in the user interface portion 33 of the operator display 30 which allow an operator of the system 10 to manipulate the view of the map displayed in the weather display window 32. Every pixel in the weather display window 32 is preferably navigated. Therefore, an icon, text, or other material may be associated with a particular geographic location, and made to appear in the correct location when a view including that location is selected to be displayed.

Information on the map view currently displayed in the display window 32 is preferably provided in the user interface portion 33 of the operator display 30. This displayed view information preferably includes the latitude 60 and longitude 62 of the center of the map displayed in the weather display window 32. The number of miles 64 represented in the map from the center of the weather display window 32 to the outside edge thereof is preferably also provided. This provides an indication of the scale of the displayed map. An operator may select these displays 60, 62, and 64 and type in new values if desired. Thus, by using the view information displays 60, 62, and 64 as a user interface, an operator can define the geographical area and scale of the map displayed in the weather display window 32. By selecting a set view button 66, a defined map view is saved as a preset view. A plurality of views may preferably be saved in this manner, and made available for easy recall. For example, a plurality of view buttons 68 may be provided in the user interface portion 33 of the operator display 30. When the set view button 66 is selected, the operator is prompted to input a number corresponding to one of the view buttons 68. Each time that the designated view button 68 is selected, the preset view will be recalled to the weather display window 32. The view buttons 68 in the graphical user interface may be assigned to correspond to function keys on the keyboard, such that a preset view may be easily recalled by depressing the appropriate function key.

Zoom in 70, zoom out 72, and home position 74 buttons may also be provided on the graphical user interface 33. Zoom in control button 70 magnifies the view of the map shown in the weather display window 32 each time the zoom in button 70 is selected. This control preferably magnifies the view of the map shown in the display window 32 in even steps each time the button 70 is selected. Similarly, the zoom out control button 72 zooms the view of the map shown in the display window 32 out in even steps each time the button 72 is selected. The home position button 74 returns the view of the map shown in display window 32 back to a user defined "home" position or view.

Preferably, a user can also zoom in anywhere on the map by defining a center point in a box. A transparent box is displayed in the weather display window 32 so that viewers can clearly see the area that is being enlarged.

Preferably, banners, logos, symbols, etc. may be placed by an operator anywhere on a map displayed in the weather display window 32. Such image-based "cut-outs" are preferably positioned on the map based on latitude and longitude. Thus, even though the scale or position of a view is changed, e.g., by zooming in and out, the cut-outs will remain positioned on the map in the proper geographic location. In other words, the cut-outs are navigated on the map.

The display of the map presented in the weather display window 32 preferably includes display filtering associated therewith which determines at which map scales specific geographic features will be displayed. For example, though city streets may be selected for display in the display window 32, using the layer list graphical user interface 34, such streets may not be displayed in large scale views over a selected threshold scale level. The fact that a geographical feature has been selected for display, but is not displayed in a currently displayed view because of the scale of the view, may be indicated on the layer list graphical user interface 34 by, e.g., a different color for the marker 36 associated with such features.

Although NEXRAD provides detailed information on the location, direction, speed, and other characteristics of a storm cell, such data is updated on a relatively infrequent basis. As discussed above, NEXRAD data can only be expected to be provided to the weather tracking and display system 10 no more often than every six (6) minutes. Thus, even though a storm cell is in continuous motion, a displayed storm cell position and track based on NEXRAD data will remain fixed for up to six (6) minutes if the displayed position and track is only updated when new NEXRAD data is received, and then will jump to a new position when a NEXRAD update is received. The result is an inaccurate display of the current position of NEXRAD storm attributes, which becomes particularly apparent when the position of the NEXRAD attributes is displayed over a live radar image of weather locations.

Figure 7:
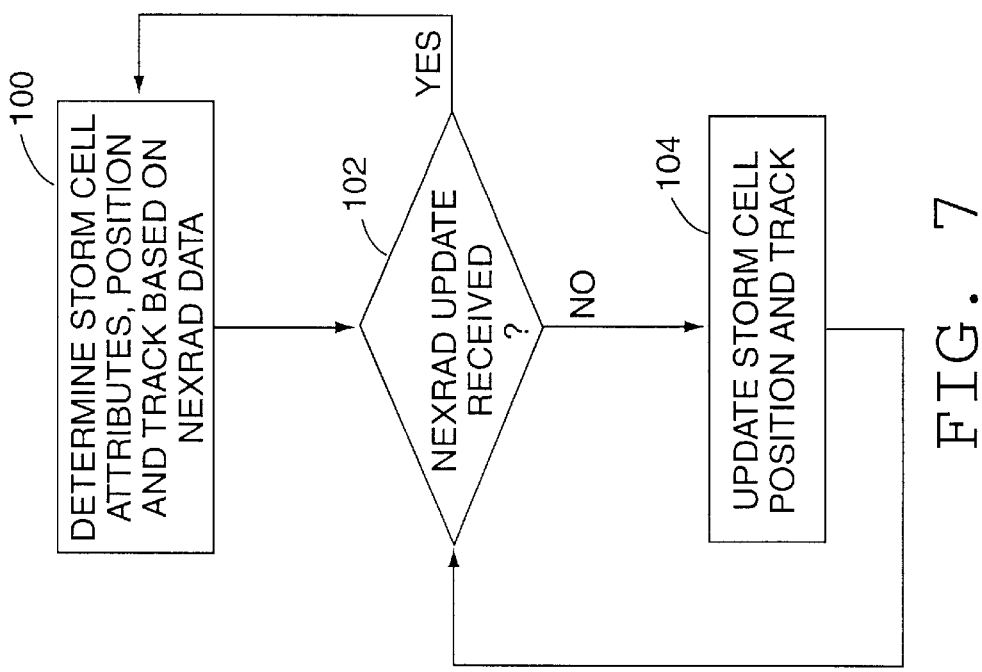
FIG. 7 is a flowchart diagram illustrating a method in accordance with the present invention for maintaining an accurate display of the position and track of storm cell information.

In accordance with the present invention, an accurate display of the current position and track of detailed storm cell attributes defined from NEXRAD data is provided by updating the displayed position and track of the storm cell attributes between NEXRAD updates. A general method of maintaining an accurate display of the position and track of NEXRAD storm cell attributes in accordance with the present invention is illustrated by the flowchart diagram of FIG. 7. As discussed above, the first step 100 in this tracking and display process is to select (either manually or automatically) storm cells to be displayed, and to determine the storm cell attributes, position, and track based, e.g., on the information contained in the NEXRAD storm attributes table. Based on this initial determination, the position and predicted track of the storm cell may be displayed based on NEXRAD data. When a NEXRAD update is received 102, the storm cell attributes, position, and track (and display thereof) may be updated based on the new information received. During the period between NEXRAD updates, e.g., periodically every minute (shorter or longer periods may be used and may be operator selectable), the displayed position and track of the NEXRAD storm cell attributes is updated at step 104. Updating of the storm cell position and track between NEXRAD updates may be based on the latest available NEXRAD information itself. For example, the displayed storm cell attributes, position, and track may be advanced periodically between NEXRAD updates based on the storm heading and speed information provided in the most recent NEXRAD update.

During the time period between NEXRAD data updates, however, the direction and speed of a storm cell can change significantly. This is particularly true for rapidly developing storm cells, for which accurate information concerning the direction and speed of movement of the storm cell is most critical. Thus, a displayed position and track of NEXRAD storm attributes based on NEXRAD data alone, even if updated periodically between NEXRAD updates, may become increasingly inaccurate as the time since the last NEXRAD update was provided increases. In accordance with the present invention, the position and predicted track of detailed NEXRAD storm cell attributes is more accurately updated between NEXRAD data updates by integrating the detailed storm cell information provided by NEXRAD with live radar data from local or remote radar sites. As discussed above, such live radar scans can provide updated position information on storm cells at a rate of up to every ten (10) (for sector scans) to ninety (90) seconds.

In accordance with the present invention, the location of intensities and other characteristics of a storm cell provided in a NEXRAD storm attributes table are advanced along a predicted line using the speed and direction of movement of the storm cell as determined from a live radar source 24 which is being fed to the weather tracking and display system 10 of the present invention. This is achieved by linking or correlating a storm cell being tracked by live radar with the same storm cell as identified in the latest available NEXRAD information. Preferably, each time a live radar scans a weather cell, the new location of the weather cell attributes defined by NEXRAD may be determined. The display of the position of the weather cell 52 in the weather display 47 is advanced to the new position determined by the live radar data. A new track display 53 is then generated and displayed, extending from this updated location, using the attributes for the storm cell as provided by the NEXRAD storm attributes table, but starting from the new location determined by the live radar data, or using new speed and heading information determined from the live radar data. This updating may continue with each sweep of the live radar. Therefore, the position of both the storm cell attributes and its predicted track is accurately maintained between the receipt of NEXRAD radar updates. When the next NEXRAD radar data update is received, the attributes for the storm cell are updated, and the NEXRAD defined storm cell re-linked or correlated to the corresponding storm cell in live radar data. The position and tracking wedge may then be updated periodically until the next NEXRAD data update is received by the system 10, using live radar data to determine the current position of the storm cell, and the latest storm attributes table information or live radar information to display the track 53 indicating the speed and direction of movement of the storm cell. Thus, the present invention provides for improved accurate tracking of detailed storm cell information using integrated NEXRAD and live radar data.

Figure 8:
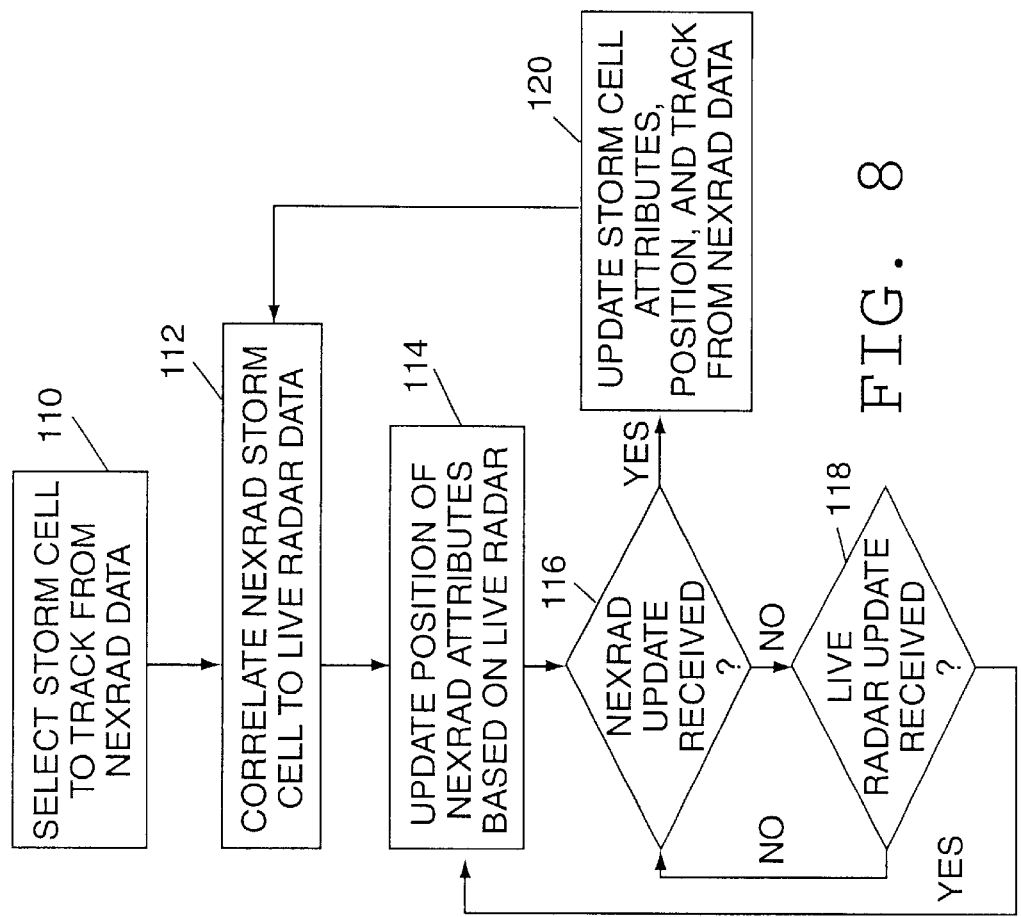
FIG. 8 is a flowchart diagram illustrating an exemplary method in accordance with the present invention for integrating NEXRAD and live radar data to provide an accurate display of the position and track of detailed NEXRAD storm cell attributes.

An exemplary method of integrating NEXRAD and live radar data to provide an accurate display of the current position and track of detailed NEXRAD storm attributes in accordance with present invention will now be described in detail with reference to the flowchart diagram of FIG. 8. At initial step 110, the storm cells to be tracked are selected from the available NEXRAD data. As discussed above, the storm cells to be tracked may be selected manually or automatically from the available NEXRAD data, and more than one storm cell may be selected for tracking.

At step 112, the selected NEXRAD storm cells to be tracked are correlated or linked to corresponding storm cells as identified in available live radar data. This linking or correlation step may be performed manually. For example, the positions of selected NEXRAD storm cells to be tracked (based on the latest available NEXRAD position data) may be displayed over a corresponding live radar image. An operator may then select the areas of storm cell activity identified in the live radar data which are to be linked to the displayed NEXRAD storm cells by indicating, e.g., using an operator input device 14, such as a mouse, areas of high intensity in the live radar data which are to be correlated or linked to each of the selected NEXRAD storm cells. In general, an operator may select the area of highest intensity in the live radar display which is located most closely to a selected NEXRAD storm cell to link that live radar activity to the NEXRAD storm cell. The operator may also take into consideration any time difference between the NEXRAD data and the live radar image displayed, direction and speed of movement information for the selected NEXRAD storm cell, and any other available information, in making the manual correlation selection.

Preferably, each NEXRAD storm cell selected to be tracked in step 110 is automatically correlated to the corresponding storm cell in live radar data in step 112. This may be accomplished, for example, by first time synchronizing the latest available NEXRAD data with available live radar data. This is necessary because there is a delay between the time at which NEXRAD radar information is obtained and the time at which such information is received by the weather tracking and display system 10. Thus, the latest available NEXRAD data, when received by the system 10, will typically not be for the same time as the latest available live radar data. Time synchronization may be achieved by, for example, employing a stored live radar image corresponding to the time of the latest available NEXRAD information (as indicated by a time stamp provided with the NEXRAD information). Alternatively, and preferably, time synchronization may be achieved by advancing the position of storm cells selected from the NEXRAD data to be tracked, based on the direction and speed of movement contained in the NEXRAD data, to new projected positions in the timeframe of the most recent live radar data.

Once the storm cell information from NEXRAD and live radar data are time synchronized, the system 10 may automatically select from the live radar image an area of storm cell activity to be linked or correlated to the corresponding selected NEXRAD storm cell. This may be achieved by the system 10 by, for example, analyzing the live radar data image to locate the area of highest intensity weather activity nearest to the time synchronized position of a selected NEXRAD weather cell, and linking such activity to the NEXRAD storm cell information. A threshold maximum distance between a NEXRAD storm cell and possible corresponding live radar activity may be provided. Also, an operator may be provided with a manual override to undo a linking or correlation between a NEXRAD storm cell and activity in live radar data if the operator, based on personal experience and knowledge which may not be available to the system 10, believes that the automatic correlation or linking of the NEXRAD and live radar data was erroneous.

Having linked or correlated the detailed storm cell attributes provided by NEXRAD data to the corresponding storm cell activity whose position information is provided by live radar data, the position of the detailed NEXRAD attributes may be updated based on the live radar data at step 114. Thus, the position of the NEXRAD storm cell information may be set to the position of, e.g., the center of storm activity identified in the live radar data as corresponding to the storm cell. In steps 116 and 118, the system 10 continually checks to determine if a NEXRAD information update has been received or if a storm cell being tracked has been scanned by live radar. Each time the system 10 determines, at step 118, that a storm cell being tracked has been scanned by live radar, the position of the NEXRAD storm cell attributes linked to the storm cell detected by the live radar are updated at step 114 based on the storm cell position provided from the live radar scan. (Updating of the position of NEXRAD attributes being tracked in this manner may be performed immediately after a cell being tracked is scanned by live radar, or after an entire radar scan is completed.) In this manner, the current position of the detailed NEXRAD storm cell attributes is determined, and may be displayed, based on timely live radar information. The displayed predicted track of the storm cell may be updated by generating a new track display (e.g., tracking wedge 53) extending from the updated location of the storm cell attributes, using direction and speed of movement information for the cell as provided by the NEXRAD storm attributes table, but starting from the new location determined by the live radar data. Alternatively, new speed and heading information, determined from the live radar data by, e.g., examining the movement of the storm cell over several live radar scans, may be used to generate and display a new track display 53.

When a NEXRAD update is received, at step 116, the storm attributes, e.g., vortex intensity, hail, etc., for the storm cells being tracked are updated from the newly received NEXRAD data at step 120. (Each storm cell in the NEXRAD storm attributes table is identified by a unique code for tracking purposes. This code can be used to identify the storm cell in subsequent storm attribute tables for the purposes of associating new storm attributes with a storm cell being tracked.) Preferably, the position and track information provided in the NEXRAD update is also employed to relink or recorrelate the NEXRAD storm cells being tracked with the corresponding storm cell activity as identified in the latest live radar data, in the manner described above with reference to step 112. As discussed above, this linking or correlation step 112 may be performed automatically, and is preferably performed with each NEXRAD update to ensure that the detailed NEXRAD storm cell attributes of interest are linked to the appropriate storm cell activity as identified in the live radar data.

The present invention is not limited to the particular exemplary applications and embodiments illustrated and described herein, but embraces such modified forms thereof as come within the scope of the following claims. In particular, it should be noted that the present invention is not limited to the particular method for integrating NEXRAD and live radar data as described herein, nor to the particular methods of updating NEXRAD-based storm cell positions and tracks between NEXRAD updates as described herein. It should also be noted that NEXRAD is referred to herein as an example of a type of weather information source which provides detailed weather information periodically less often than less detailed live radar data. The present invention is not limited to applications using NEXRAD and live radar data, but may be employed using weather information provided from a variety of weather information sources.

What is claimed is:

1. A method for determining and updating the current position of a weather cell, comprising the steps of:
    (a) receiving first weather information periodically from a first weather information source;
    (b) determining a current position of the weather cell from the first weather information periodically each time the first weather information is received; and
    (c) determining an updated current position of the weather cell at least once between each reception of the first weather information.

2. The method of claim 1 comprising the additional steps of displaying an indication of the determined current position of the weather cell on a geographic display and updating the position of the indication on the geographic display in response to the determined updated current position.

3. The method of claim 1 comprising the additional step of determining a predicted track of the weather cell from the first weather information periodically each time the first weather information is received.

4. The method of claim 3 comprising the additional step of displaying an indication of the determined current position and the predicted track of the weather cell on a geographic display.

5. The method of claim 4 wherein the step of displaying an indication of the predicted track of the weather cell on the geographic display includes the step of displaying a tracking wedge on the geographic display, wherein the tracking wedge extends from the indication of the current position of the weather cell and includes a direction corresponding to a predicted direction of movement of the weather cell and a length corresponding to a predicted distance of movement of the weather cell over a selected period of time based on the predicted track of the weather cell.

6. The method of claim 1 wherein the first weather information includes direction and speed of movement information for a weather cell and wherein the step of determining an updated current position of the weather cell includes the step of determining an updated current position of the weather cell based on the direction and speed of movement information for the weather cell contained in the most recently received first weather information.

7. The method of claim 6 wherein the step of determining an updated current position of the weather cell based on the direction and speed of movement information for the weather cell contained in the most recently received first weather information is performed periodically between each reception of the first weather information.

8. The method of claim 6 wherein the first weather information source is NEXRAD and the first weather information is NEXRAD information.

9. The method of claim 1 wherein the step of determining an updated current position of the weather cell includes the steps of receiving second weather information from a second weather information source at least once between each reception of the first weather information, the second weather information including an updated location of the weather cell, and determining the updated current position of the weather cell from the second weather information.

10. The method of claim 9 wherein the second weather information is received periodically from the second weather information source a plurality of times between each reception of the first weather information and wherein the step of determining the updated current position of the weather cell from the second weather information is performed a plurality of times between each reception of the first weather information.

11. The method of claim 10 wherein the second weather information source is live radar and the second weather information is live radar information.

12. The method of claim 11 wherein the first weather information source is NEXRAD and the first weather information is NEXRAD information.

13. The method of claim 9 comprising the additional step of determining an updated predicted track of the weather cell from the second weather information.

14. The method of claim 3 comprising additionally the steps of determining selected cities which are in the predicted track of the weather cell and displaying a list of the cities which are in the predicted track of the weather cell.

15. The method of claim 14 comprising the additional steps of determining a predicted arrival time of the weather cell at least one of the selected cities from the predicted track of the weather cell, and displaying the determined predicted arrival time of the weather cell at the selected city.

16. The method of claim 14 comprising the additional steps of determining a predicted time period from a present time to a predicted arrival time of the weather cell at least one of the selected cities from the predicted track of the weather cell, displaying the predicted time period, and updating the display of the predicted time period as the present time advances.

17. The method of claim 14 comprising the additional step of displaying a highlighted display of the cities which are in the predicted track of the weather cell on a geographic display.

18. A method for determining and updating the position of a weather cell, comprising the steps of:
 (a) receiving first weather information periodically from a first weather information source;
 (b) determining a position of the weather cell from the first weather information;
 (c) receiving second weather information from a second weather information source at least once between each reception of the first weather information; and
 (d) determining an updated position of the weather cell from the second weather information at least once between each reception of the first weather information.

19. The method of claim 18 wherein the step of determining a position of the weather cell from the first weather information is performed periodically each time the first weather information is received.

20. The method of claim 18 comprising the additional steps of displaying an indication of the determined position of the weather cell on a geographic display and updating the position of the indication on the geographic display in response to the determined updated position.

21. The method of claim 18 comprising the additional step of determining a predicted track of the weather cell from the first weather information.

22. The method of claim 21 comprising the additional step of displaying an indication of the determined position of the weather cell and a predicted track of the weather cell on a geographic display.

23. The method of claim 22 wherein the step of displaying an indication of the predicted track of the weather cell on the geographic display includes the step of displaying a tracking wedge on the geographic display, wherein the tracking wedge extends from the indication of the position of the weather cell and includes a direction corresponding to a predicted direction of movement of the weather cell and a length corresponding to a predicted distance of movement of the weather cell over a selected period of time based on the predicted track of the weather cell.

24. The method of claim 21 comprising the additional step of determining an updated predicted track of the weather cell from the second weather information.

25. The method of claim 18 wherein the second weather information is received periodically from the second weather information source a plurality of times between each reception of the first weather information and wherein the step of determining the updated position of the weather cell from the second weather information is performed a plurality of times between each reception of the first weather information.

26. The method of claim 25 wherein the second weather information source is live radar and the second weather information is live radar information.

27. The method of claim 26 wherein the first weather information source is NEXRAD and the first weather information is NEXRAD information.

28. A weather tracking system, comprising:
 (a) means for receiving first weather information periodically from a first weather information source;
 (b) means for determining a current position of the weather cell from the first weather information periodically each time the first weather information is received; and
 (c) means for determining an updated current position of the weather cell at least once between each reception of the first weather information.

29. The weather tracking system of claim 28 comprising additionally an operator display and means for displaying an indication of the determined current position of the weather cell on a geographic map on the operator display and for updating the position of the indication in response to the determined updated current position.

30. The weather tracking system of claim 29 comprising additionally means for determining a predicted track of the weather cell from the first weather information periodically each time the first weather information is received.

31. The weather tracking system of claim 30 comprising additionally means for displaying an indication of the determined current position and predicted track of the weather cell on a geographic map on an operator display.

32. The weather tracking system of claim 31 wherein the means for displaying an indication of the predicted track of the weather cell includes means for displaying a tracking wedge on the geographic map on the operator display, wherein the tracking wedge extends from the indication of the current position of the weather cell and includes a direction corresponding to a predicted direction of movement of the weather cell and a length corresponding to a predicted distance of movement of the weather cell over a selected period of time based on the predicted track of the weather cell.

33. The weather tracking system of claim 28 wherein the means for determining an updated current position of the weather cell includes means for determining an updated current position of the weather cell based on the direction and speed of movement information for the weather cell contained in the most recently received first weather information.

34. The weather tracking system of claim 33 wherein the first weather information source is NEXRAD and the first weather information is NEXRAD information.

35. The weather tracking system of claim 28 comprising additionally means for receiving second weather information from a second weather information source at least once between each reception of the first weather information, the second weather information including an updated location of the weather cell, and wherein the means for determining the updated current position of the weather cell includes means for determining the updated current position of the weather cell from the second weather information.

36. The weather tracking system of claim 35 wherein the second weather information source is live radar and the second weather information is live radar information.

37. The weather tracking system of claim 36 wherein the first weather information source is NEXRAD and the first weather information is NEXRAD information.

38. The weather tracking system of claim 35 comprising additionally means for determining an updated predicted track of the weather cell from the second weather information.

39. The weather tracking system of claim 30 comprising additionally an operator display and means for determining selected cities which are in the predicted track of the weather cell and for displaying a list of the cities which are in the predicted track of the weather cell on the operator display.

40. The weather tracking system of claim 39 comprising additionally means for determining a predicted arrival time of the weather cell at least one of the selected cities from the predicted track of the weather cell, and for displaying the determined predicted arrival time of the weather cell at the selected city on the operator display.

41. The weather tracking system of claim 39 comprising additionally means for determining a predicted time period from a present time to a predicted arrival time of the weather cell at least one of the selected cities from the predicted track of the weather cell, for displaying the predicted time period on the operator display, and for updating the display of the predicted time period as the present time advances.

42. The weather tracking system of claim 39 comprising additionally means for displaying a highlighted display of the cities which are in the predicted track of the weather cell on a geographic map on the operator display.

43. A weather tracking system, comprising:
(a) means for receiving first weather information periodically from a first weather information source;
(b) means for determining a position of the weather cell from the first weather information;
(c) means for receiving second weather information from a second weather information source at least once between each reception of the first weather information; and
(d) means for determining an updated position of the weather cell from the second weather information at least once between each reception of the first weather information.

44. The weather tracking system of claim 43 comprising additionally an operator display and means for displaying an indication of the determined position of the weather cell on a geographic map on the operator display and updating the position of the indication on the geographic map in response to the determined updated position.

45. The weather tracking system of claim 43 comprising additionally means for determining a predicted track of the weather cell from the first weather information.

46. The weather tracking system of claim 45 comprising additionally an operator display and means for displaying an indication of the determined position of the weather cell and a predicted track of the weather cell on a geographic map on the operator display.

47. The weather tracking system of claim 46 wherein the means for displaying an indication of the predicted track of the weather cell on the geographic display includes means for displaying a tracking wedge on the geographic map on the operator display, wherein the tracking wedge extends from the indication of the position of the weather cell and includes a direction corresponding to a predicted direction of movement of the weather cell and a length corresponding to a predicted distance of movement of the weather cell over a selected period of time based on the predicted track of the weather cell.

48. The weather tracking system of claim 45 comprising additionally means for determining an updated predicted track of the weather cell from the second weather information.

49. The weather tracking system of claim 43 wherein the second weather information source is live radar and the second weather information is live radar information.

50. The weather tracking system of claim 43 wherein the first weather information source is NEXRAD and the first weather information is NEXRAD information.

* * * * *